Figure 1:
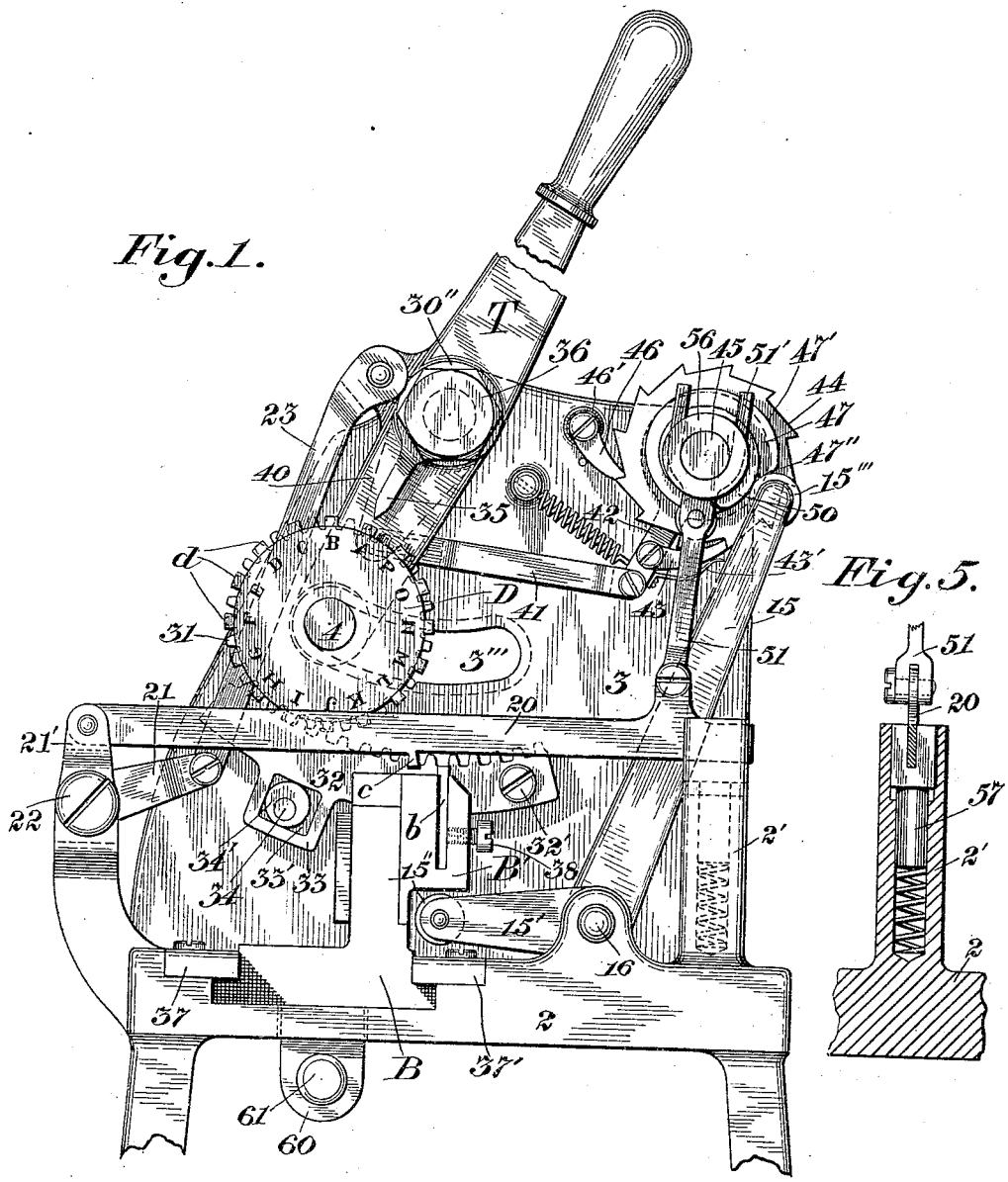

F. H. RICHARDS.
MACHINE FOR MAKING TYPES AND TYPE BARS.
APPLICATION FILED DEC. 17, 1900.

940,277.

Patented Nov. 16, 1909

5 SHEETS—SHEET 3.

Witnesses:

Inventor,

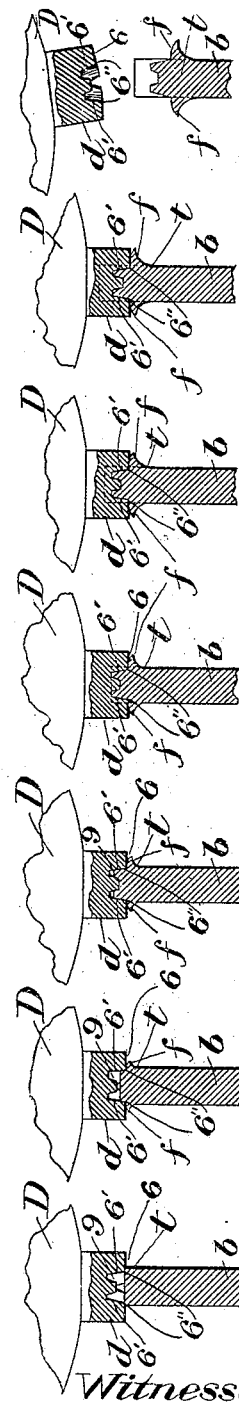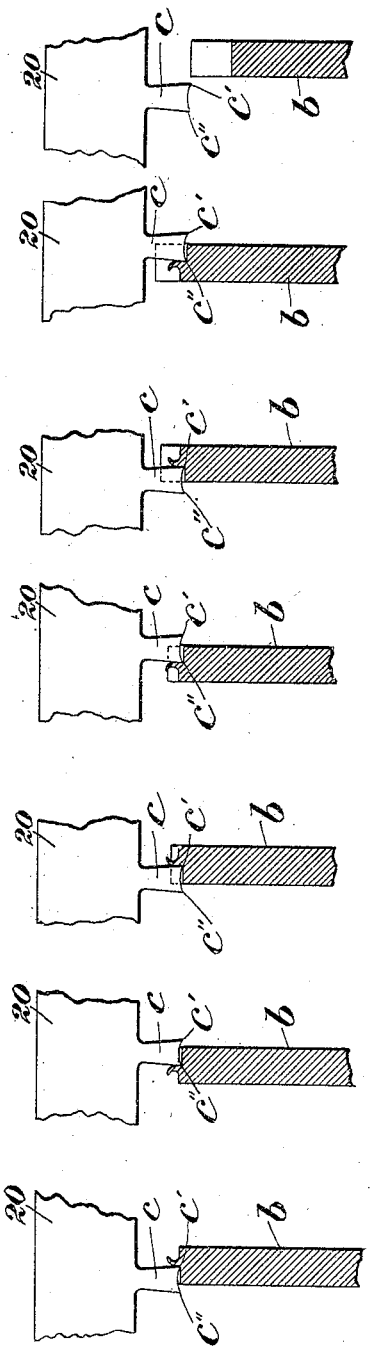

F. H. RICHARDS.
MACHINE FOR MAKING TYPES AND TYPE BARS.
APPLICATION FILED DEC. 17, 1900.

940,277.

Patented Nov. 16, 1909.
5 SHEETS—SHEET 5.

Witnesses:
C. A. Jarvis.
C. Champion

Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

MACHINE FOR MAKING TYPES AND TYPE-BARS.

940,277.   Specification of Letters Patent.   Patented Nov. 16, 1909.

Application filed December 17, 1900. Serial No. 40,086.

*To all whom it may concern:*

Be it known that I, FRANCIS H. RICHARDS, a citizen of the United States, residing at Hartford, in the county of Hartford and State of Connecticut, have invented certain new and useful Improvements in Machines for Making Types and Type-Bars, of which the following is a specification.

This invention relates to a machine for making types and typebars, and especially to a mechanism for making from a solid blank or bar of metal a typebar adapted for use in the typographic art for printing a line of characters.

My present invention is in the nature of a companion mechanism to the mechanism shown, described, and claimed in my applications Serial Nos. 79,359, filed Oct. 21, 1901, and 79,360, filed Oct. 21, 1901, in which applications there are disclosed two species of mechanisms for forming a type upon a typebar-blank without previously setting off a type-blank; that is to say, in said applications I have illustrated two specific machines for forming a type upon the edge of a typebar-blank without first reducing or removing material in advance of the metal from which such type is to be formed.

My present invention is a machine for making types and especially typebars which is distinguishable from the machines described in my said companion applications by reason of the fact that each space is formed by the mechanism by an operation entirely independent of the operation which forms the type preceding such space. In my said companion applications the formation of the space in advance of a type is dependent upon the formation of such type, for the reason that in such case the space is formed by a wall of the die which forms the type, whereas in the present case the formation of a space in advance of a type is not dependent upon the formation of such type for the reason that in this case the space and the type are formed by separate and independent members or elements, the type being formed in this case by a die which is rolled in contact with the edge of the blank, and the space being formed by a planing tool or cutter which is reciprocated back and forth across the edge of such blank.

In forming a type on a typebar-blank by means of my improved type-making mechanism I employ a device or die for compressing a portion of the blank while such portion is supported at its forward side, and in making a space in advance of such type I employ a space-forming device for removing material from that portion of the typebar-blank which is in advance of such type, not earlier than the beginning of the type-forming operation, and preferably this space-forming tool or cutter operates synchronously with the type-forming die, although the space-forming operation is entirely independent of the type-forming operation, this being one species of mechanism for making a type and a space in advance of such type independently without first forming the space, another species of such mechanism being shown, described, and claimed in my companion application Serial No. 40,575, filed December 20, 1900, which covers a mechanism having type-forming and space-forming means operative for forming a type and a space in advance of such type independently and successively, the space-forming means operating after the completion of the operation of the type-forming means.

In all of my said applications hereinbefore referred to a type-die is employed to compress or roll the edge of a typebar-blank while in contact therewith, the compressing action being exerted in such a way as to force most of the surplus stock sidewise of the typebar-blank, instead of endwise thereof. This surplus material so forced out being removed or severed from the bar preferably after the completion of the type. During the type-forming operation the portion of the typebar-blank which is being operated on is confined endwise of the blank preferably between two separated lines, one of which in this case defines the inner rear wall of the die and the other of which is substantially the line of separation of the type and the space to be formed in advance of such type. In other words, the material being operated on to form a type is confined at its rear side by the inner rear wall of the die and is confined or supported at its forward side by the adjoining space-formative stock which has not been removed up to the commencement of the type-forming operation; and while it should be noted that the type-formative portion of the blank is confined, and an adequate support for the type preserved throughout the operation of the type-forming means, yet it will be seen also that in this case the confinement and support of the type-formative material are not due at all to the presence of a space-forming blade dependent for its operation upon the operation of the die, as is the case in my aforesaid companion applications Serial Nos. 79,359 and 79,360. As in said applications, however, practically all of the surplus stock within any type-field may be forced beyond the limits of such field in a direction transverse to the blank without disturbing the stock of any adjacent field, the flowage being almost entirely in a direction crosswise of the typebar-blank and the metal so forced out being afterward severed from the typebar-blank if it projects beyond the planes of the sides of the latter, as is usually the case. In all of my applications hereinbefore mentioned an important feature of the mechanism is type-forming means operative for gradually forming a type by repeatedly rolling a transverse portion of the edge of a typebar-blank while the edge is in contact with the type-forming member or die, one of these members, in the present instance the die, being preferably reciprocated rapidly in a curvilinear path in order that the type during formation may be subjected to such repeated rollings; and moreover a feed movement may be imparted to one of the members to bring it more and more fully into engagement with the other, the result being that the type is gradually shaped to its finished form by a series of operations which serve conjointly to finish the type perfectly and also to strengthen the body of the type very materially during the shaping of the latter.

When a blank is rolled while in contact with a die it is not essential that either of these members be operated in such a way as to have a rolling movement, but merely that the movement imparted to such member be of a character for affecting the reduction of the blank by a rolling process. In the present case, however, a rolling movement is imparted to the die itself, and all of the various operations to which the material is subjected during the making of a type result from two movements—viz., a rolling movement of one member of the mechanism and a feed movement of one member toward the other—and in every case where these two movements are produced by operating one or both of the parts just mentioned each type will be formed gradually and the type-formative material will be subjected to various operations that will condense the metal little by little and gradually form a wrought-metal type. The principal operations to which the material will be subjected will be the rolling of the upper or face portion of the blank, the swaging of the face of the type, and the forging of the end walls thereof, and all of these operations may be performed most advantageously by a single type-forming die. The order in which said operations occur may, of course, vary, as may also the duration and extent of the same, and as any one of these factors is varied the manner in which, and the extent to which, the material is acted upon and shaped will show a corresponding variation. In every case, however, I deem it desirable to employ means for shearing out a type-block, usually on the edge of a typebar-blank, and for rolling the material at opposite sides of such blank away from the latter and preferably beyond the sides of the typebar-blank, this material outside of the sheared type-block containing most of the excess which it is necessary to get rid of if types are to be formed thereon in close succession. When such material between the sides of the typebar-blank is rolled in this manner substantially all of the flowage is in a direction transverse to the blank and there is practically no flowage lengthwise of the bar, especially when the rolled portion of the stock during the operation of the type-forming means is substantially continuous with the remainder of the typebar-blank.

It is essential that the major portion of the surplus material be gotten rid of by removing it, as by rolling it, from a point where it will interfere with the formation of a type to a point where it will not so interfere, and preferably to a point or points beyond the sides of the bar, and the type itself is formed by shaping the material of the central type-block sheared from the mass at any given point. In the present case the type-die operates upon this surplus material and upon the type-block or type-blank simultaneously, and during the time that the excess material is being rolled beyond the sides of the bar the type-block is also being shaped to bring it to its finished form. When the blank and the die are in contact with each other and one of them is rolled, and a feed movement is also imparted to one of them to advance it toward the other, the type-blank will be sheared gradually from the mass and the surrounding material will be rolled off while the shearing operation is taking place. Moreover the type-die will also operate upon the type-blank to shape the same into a type before the completion of the shearing action, and also, of course, before all of the surrounding excess material has been rolled beyond the sides of the bar. As the rolling and feeding operations continue the base of the type-block is reduced at opposite sides of the bar, the metal condensed by a forging action, and the upper portion of the type-block forced up to fill the die, which serves to swage the face of the block and shape the face of the type.

Thus not only may the die be completely filled and the face of the type perfectly formed, but the end walls of the latter will be so condensed by the forging operation of the die as to form a base having the maximum amount of strength for supporting the head of the type and resisting any crushing forces that may be exerted upon the latter when in use.

The operation of the space-forming means is not only entirely independent of the type-forming action, but it need not be at all analogous thereto. This is the case with the present invention, in which the type-forming means operates to roll the edge of the typebar-blank while the space-forming means forms a space in advance of the type by gradually cutting or planing away the stock, said space-forming means, of course, serving merely to remove material from the blank and exerting no compressing or condensing action thereon. In operating this mechanism the space-forming means does not begin to remove material in advance of a type earlier than the beginning of the operation of the type-forming means, and preferably the space-forming and type-forming operations are synchronous; that is to say, while the type-forming and space-forming operations are entirely independent of each other they begin to operate upon the stock at the same time and their actions cease practically simultaneously, and thus the material in advance of the forming type, and which serves as a means for resisting the type-forming action and supporting the type at its forward side, is removed at substantially the same rate as the type-formative material is compressed, and hence the space-forming operation proceeds at substantially the same rate as the type-forming operation. When the type-forming and space-forming means shape the typebar-blank in this manner it will be evident that there will be resistant material at the forward side of the forming type during the whole of the type-forming operation, and that the material in the type-field and the material in the space-field are connected by a substantially horizontally-disposed mass of stock throughout the whole period during which the type-forming means is rolling the bar to form a type. That improvement in machines for making typebars in which the type-forming means and the space-forming means operate upon the blank independently, but in which the space-forming means does not begin to operate upon the stock until the operation of the type-forming means is finished, is not set forth herein but constitutes the subject-matter of my companion application Serial No. 40,575, filed December 20, 1900.

Figure 2:
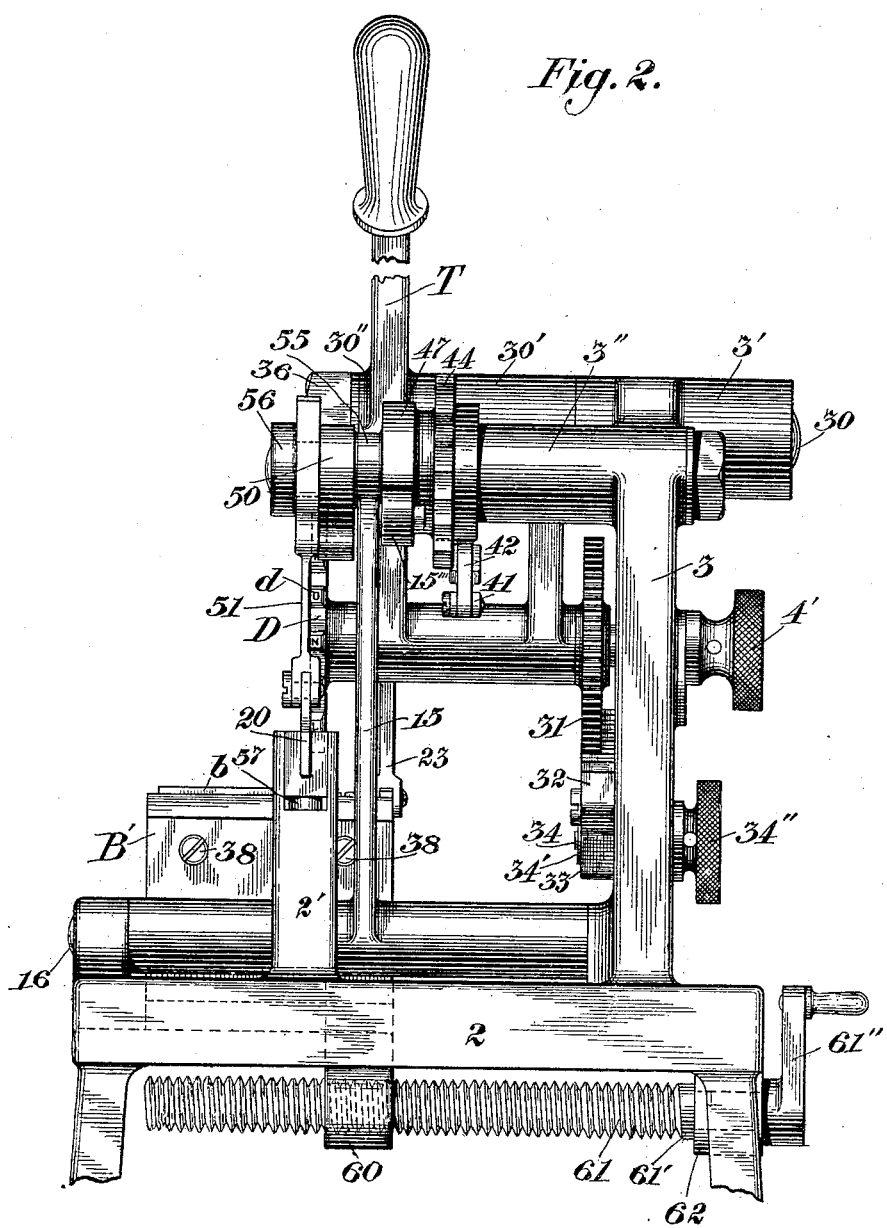
Figure 3:
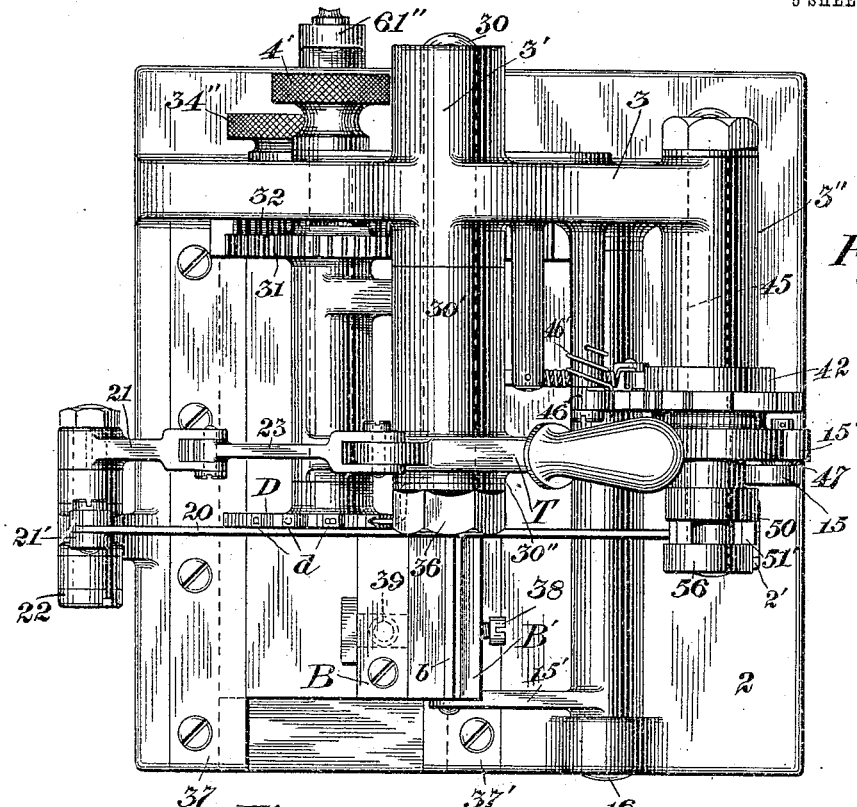
Figure 4:
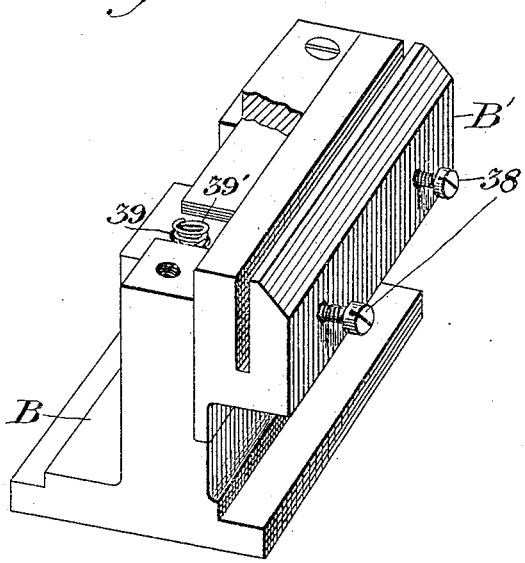
Figure 23:
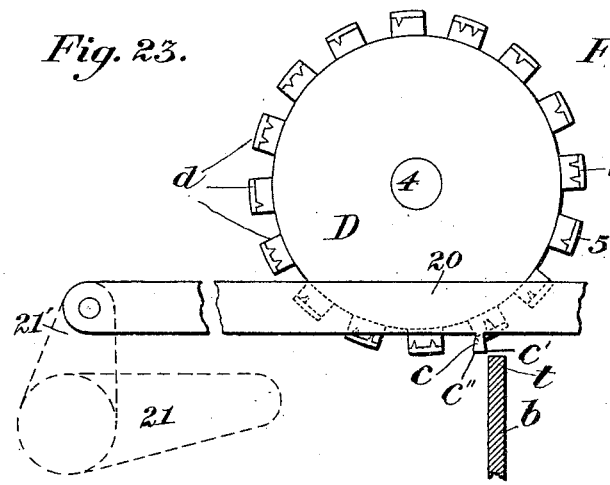
Figure 20:
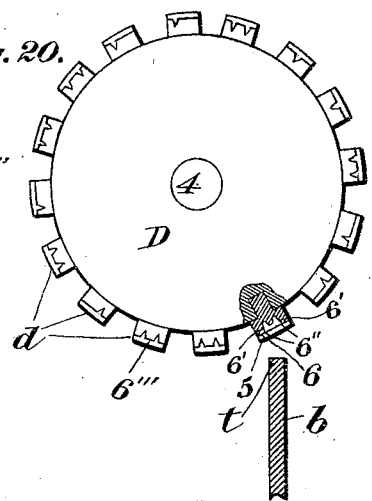
Figure 24:
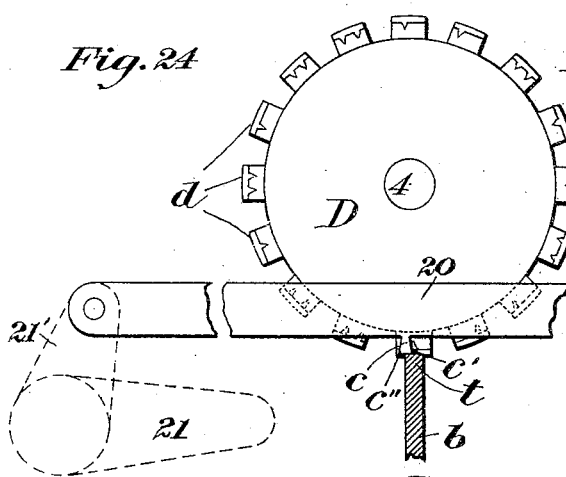
Figure 21:
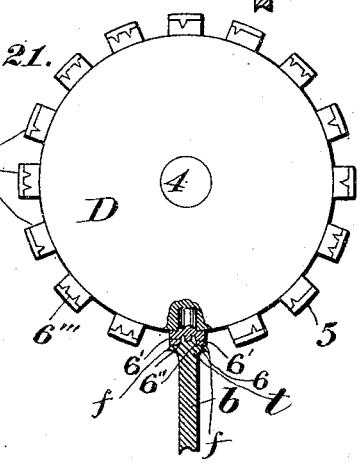
Figure 25:
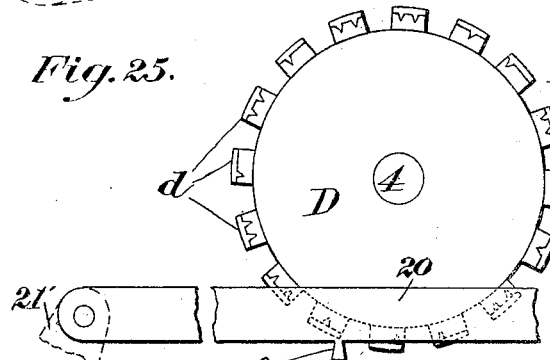
Figure 22:
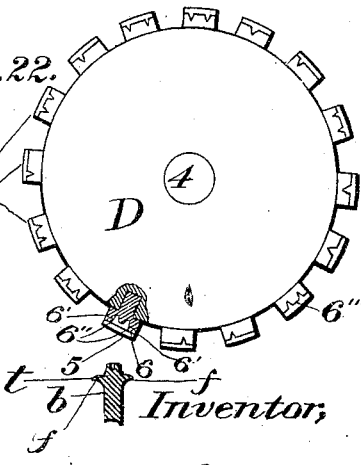

In the drawings accompanying this specification and forming part of the present application, Figure 1 is a side elevation of a typebar-machine constructed in accordance with my present invention. Fig. 2 is an end elevation of the same looking from the right in Fig. 1. Fig. 3 is a plan of the same. Fig. 4 is an enlarged perspective view of the principal parts of the blank holding and feeding mechanism. Fig. 5 is a sectional detail which will be hereinafter more particularly described. Figs. 6 to 12, inclusive, are enlarged, sectional end elevations of a portion of a die and a typebar-blank, and illustrate successive steps in the operation of forming a type by repeated rollings. Figs. 13 to 19, inclusive, are similar views illustrating corresponding steps in the operation of forming a space in advance of a type substantially synchronously with the type-forming operation. Figs. 20 to 22, inclusive, are sectional side elevations illustrating three relative positions of the die-wheel and one of its dies with respect to the typebar-blank, and show not only different stages in the type-forming operation but also the beginning of the rolling on of the die, the central working position thereof, and the rolling off of said die. Figs. 23 to 25, inclusive, are similar views illustrating the manner in which the space-forming tool or cutter is oscillated in timing with the operation of the die; and Fig. 26 is a diagram illustrating the rise and drop of a cam employed to control the feed of the blank toward the die.

Similar characters designate like parts in the different figures of the drawings.

The several operative parts of the mechanism may be mounted on any suitable framework, such, for example, as a base or bed 2, supported in this case on legs in a well-known manner, and this bed-plate may have an upright or plate 3 rising therefrom and embodying a pair of long bearings 3' and 3''. The bearing 3' may serve to support a long pin or stud 30, said pin or stud preferably having mounted thereon a lever, such as T, which in this case constitutes a part of the type-forming mechanism, and has a cheek 30'' in engagement with the corresponding cheek of the bearing 3'. Said lever may have the usual handle at the upper end thereof, and is intended to support for rotation thereon while moving in an orbital path a die-carrier, such as D, which may have formed thereon or secured thereto a plurality of dies, such as $d$. The orbital path in which this die-carrier moves may be a relatively short one, and in the present case the hub or shaft of the die-wheel, which hub or shaft is indicated herein by 4, is movable in a slot 3''' in the wall 3, and is limited in its movements by the stop walls at the ends of such slot, said shaft preferably having at the end thereof opposite the die-wheel a knurled head 4' for turning the same. It will be noticed by referring to Fig. 1 that the major portion of this slot is disposed at one side of a central, vertical line passing through the axis of the lever T, and also that said line passes through the center of the face of the typebar-blank to be operated on by the dies of the carrier. One reason for this is that while only a slight orbital movement is necessary for the purpose of forming a type on the typebar-blank, it is desirable to make provision for considerable extra throw of said die-wheel for the purpose of disconnecting the same from its driving member. This die-wheel may be rotated in any suitable manner while moving in its orbit, but for the purpose of imparting such rotary movement thereto I have shown at 31 a driven spur-gear secured to the shaft 4, this spur-gear being driven in the present case by a driving-gear, preferably in the form of a fixed resistant gear or rack 32. In the construction shown the driven and driving gears are so associated that one of them will be shiftable toward and from the other in the plane of the orbital movement of the driven gear, and in this case the rack is pivoted at 32' so that it may be swung down at its opposite end out of mesh with the teeth of the spur-gear 31 when the parts are in the positions shown in Fig. 1. In order that the rack or segment may be dropped in this manner said rack has in the present case an extension 33 with an opening 33' therein, in which may work the eccentric portion 34', of an eccentric-stud 34, mounted in the upright 3, and preferably having a knurled head 34" for turning the same. It will be noticed that this eccentric-pin may serve not only as a means for releasing the rack but also for taking up wear between the teeth of the rack and the pinion.

It is only necessary to release the driving and driven gears in the manner just described when it is desired to bring a different die into position for the purpose of forming another type. In order to locate any die precisely in its working position I preferably employ in connection therewith some means for indicating such precise working position, a pointer being shown herein at 35 for this purpose, said pointer being mounted in the present case on the threaded forward end of the shaft 4 and in contact with the forward cheek of the hub 30" of the lever T and being held in place by a nut 36. In order that each selected die may be properly located it will be evident that the teeth of the driving and driven gears must be properly spaced with respect to such dies, there being in this case twice as many teeth in the driven gear 31 as there are dies on the die-wheel D which moves in unison with said gear.

The blank, which may be of any material suitable for the purpose but will usually be a type-metal of proper composition, is designated by $b$ and may be supported by, and be movable with, a blank holder or carrier, such as B', mounted on, and movable vertically relatively to, a second blank-carrier or blank-carriage, such as B, which may be mounted on the base 2 so as to have a feed movement thereover, said carriage being confined in this case by suitable side guides, such as 37 and 37', and the blank itself being preferably held in place in the carrier B' by clamp-screws, such as 38. Here the movable carrier B' has a bore 39 therein, in which is seated a spring, such as 39', which at its upper end is in contact with a face of the carriage B and tends to force the movable carrier B' downward, while suitable operating means may be employed for the purpose of raising the movable carrier B' at the proper time. In the construction shown an angle-lever is pivoted at 16 on the base 2, and has a short arm 15, carrying at its end an antifriction-roll 15", for raising the movable carrier B', while the long arm of said angle-lever is designated by 15, and has in this case an antifriction-roll 15''', coacting with a suitable operating member—such as a cam—the movements of which are preferably controlled by the lever T. In this case said lever has formed thereon a short arm 40, to the lower end of which is pivoted, by a pin-and-slot connection, the slot of which is designated by 41', a connecting-rod 41, the other end of which is pivoted to an oscillatory arm 42, loosely mounted on a short shaft 45, journaled in the long bearing 3", said arm 42 constituting a pawl-carrier for a pawl, such as 43, which may be pressed, by means of a spring 43', into engagement with the teeth of a ratchet-wheel 44, movable with the shaft 45, and hence serving to turn the latter step by step. A stop pawl, such as 46, held in place by a spring 46', may be employed to prevent overthrow and return movement of the ratchet-wheel. This shaft will therefore be turned step by step as the lever T is swung back and forth, it being evident, of course, that the ratchet-wheel will be turned only when the die-wheel D swings to the right, as seen in Fig. 1. The shaft 45 constitutes in the present case a means for controlling the movements of the arm 15 of the angle-lever that serves to feed the blank toward the die during the type-forming operation, and the cam which has been hereinbefore alluded to as the means for operating said arm 15 is carried by said shaft 45, said cam being shown herein at 47, and having a gradual rise 47', which will cause the blank to be raised in a corresponding manner and which is clearly indicated in the diagram in Fig. 26, said cam having also a somewhat quick drop, which is clearly indicated by the line 47".

The entire operation of forming a type is carried out in this case by operating one of the dies $d$ in contact with the blank $b$ and feeding said blank toward the die, and the die employed is so constructed that it forms a type but does not form a space in advance of such type. A die of this construction, while operating as a single mechanical element, and while it is actually constructed in one piece, has many functions that may be carried out by a large number of tools having a single function; that is to say, it not only serves to shear out a type-block to fill the die-space, but it also rolls the face of the type-block, swages the face of the type to form, and forges the end walls of the type.

The type-dies shown herein have only one blade each, as distinguished from the dies shown in my companion applications Serial Nos. 79,359 and 79,360 hereinbefore referred to, this blade being at the rear side of the die and being preferably of the structure shown at 5. (See Figs. 21 and 22.) This blade is somewhat thin and is preferably considerably thinner than the tool which serves to form the space in advance of each type. Said blade forms a means for confining endwise of the bar flowage of the stock toward the rear side of the die, the solid body of metal in the blank in advance of the die that is being operated serving to confine endwise flowage at the forward side of the die, although, of course, during compression surplus stock will be free to flow out crosswise of the bar. The blade 5 preferably projects throughout its whole length beyond the outer or bottom wall of the die, and hence throughout the whole period during which a type is being formed said blade serves to confine at that side of the die the mass of material that is being shaped. The bottom 6 of the die serves to roll out sidewise the major portion of the material not required for the making of a type. The end walls of the die-space, which are indicated herein by 6', intersect the bottom 6 in the usual way, as at 6'', and the edges 6'' serve to shear or cut away from the mass of the bar a type-block or type-blank containing sufficient material to fill the die-space and to form a finished type; and that part of the edge of the typebar-blank which is operated on, but is not compressed by the blade 5, and is not contained within the die-space, is compressed by the bottom wall 6 of the die and is rolled off sidewise of the typebar-blank when the die-carrier D is rolled back and forth transversely to the typebar-blank, but the material so rolled off is always confined endwise of the bar between the blade 5 and that portion of the stock contained in the typebar-blank immediately in advance of and below the outer forward wall 6''' of the die. Hence none of this surplus material is operated on in such a manner as to force it into the field of an adjacent type or space, but instead all of the excess flows sidewise of the blank and may be severed from the bar to bring the sides of the latter into parallelism with each other.

The manner in which and the extent to which the type-formative material confined between the blade 5 and the stock in advance of the forward wall 6''' is operated upon are dependent upon the rolling movement of the die and also upon the feed movement of the blank. In this case, as will be evident from the previous description of the feed mechanism, the blank is fed step by step toward the die in a regular manner as the die travels back and forth across the edge of the blank, and hence during the rolling movement of the die the type-forming action will be carried down into the stock through successive and substantially equal distances, although, of course, it will be understood that the effect of the rolling action upon the blank will not be the same for each operation of the die.

As in my companion applications hereinbefore mentioned, the type-forming means subjects the stock to a series of operations by means of which a type is formed without impairing the strength of the type-formative material of the typebar-blank. It has been stated before that these blanks will be a suitable composition of type-metal, and moreover they may be in the form of separate typebar-blanks or a continuous strip or ribbon of metal from which the typebars may be severed after being completed. In every case, however, wrought-metal blanks formed ordinarily by the usual rolling operations should be employed, as I have found in practice that cast-metal blanks are undesirable for the purpose and are not so well adapted to be wrought into shape by such operations as are employed in this case. The principal reason for this is that cast metal when rolled and forged in this manner tends to crush and crumble beneath the die instead of compressing and flowing properly, and hence the cast metal will not fill the dies so well as the wrought-metal nor form the smooth faces and sharp edges that the latter will.

The manner in which a type is shaped when the blank is subjected to the action of a rolling die during the feeding of the blank toward the die is somewhat complex, but as illustrated approximately in Figs. 6 to 12, inclusive, and also in Figs. 20 to 22, inclusive, which illustrate the appearance of the forming type during certain stages of the operation. As the die is swung toward the right and toward the left alternately, the stock at the base of the type-blank or type-block $t$ is forged first at the left-hand side and then at the right-hand side, the forging action being, of course, greatest near the base of the type-block and also being greater as the forging action is carried farther and farther down into the stock. This forging action, however, extends up the entire length of the side being operated on, and results in a thorough compacting or condensing of the particles of the blank. The forging action being greatest at the base of the type-block the latter will be strengthened most in the region of its base, but the strengthened base will also be connected with the face of the type by a thick layer of condensed metal thoroughly compacted by the forging operation. At the same time that this metal is compressed by the forging action of the end walls 6' of the die-space the central, upper portion of the type-blank is forced upward into the die, owing to the resistance opposed to the forging action by the upper walls of said die-space. At each movement of the die toward the right or toward the left the metal so forced up tends to fill one side of the space 9, while the opposite side of said space forms an outlet through which the air confined between the type-blank and the die may escape. During these two movements—viz., the rolling of the die and the feeding of the blank toward the die—the cutting edges 6'' of the die shear farther and farther into the metal of the typebar-blank and gradually complete the cutting out of the type-block or type-blank from the mass of the metal. This type-blank, it will be seen, is not completely sheared from the typebar-blank until the actual completion of the making of the type. In other words, the shearing of the type-blank and the formation of a type from that type-blank are substantially coincident in the present application as in my companion applications hereinbefore mentioned. Each time that a feed movement of the blank and a rolling movement of the die occur an additional portion of the surplus material confined between the die-blade 5 and the mass of metal in advance of the outer forward wall of the die is forced out sidewise of the blank principally by the bottom wall 6. After such portion of the surplus has been forced out sidewise in this manner the cutting edges 6'' at the next operation shear farther into the body of the blank and the metal at the point at which such cutting edge previously operated is forced farther out toward or beyond the side of the bar.

In the mechanism illustrated herein the gradual formation of each type is accomplished in twenty-four strokes of the lever T, twelve in each direction, and Figs. 6 to 12, inclusive, illustrate seven of the relative positions of the die and the blank from the beginning to the end of such operation, Fig. 12 illustrating how the blank is permitted to drop on the twenty-third stroke in order to separate the die and the blank without impairing the finished type.

As before stated, the space-forming means or space-forming tool for forming the space in advance of each individual type may operate in any suitable manner, provided that such operation does not begin before the die begins to operate upon the blank. The space-forming operation, however, should be entirely independent of, and distinct from, the type-forming operation, and provided that this is the case it is immaterial how the type-forming and space-forming means may be operated. The mechanism shown in the present application is intended to form the space and the type simultaneously, and hence the stock contained in the space-field, which is the space occupied by the material upon which the space-forming tool operates, will be removed at substantially the same rate that the material in said type-field is rolled, swaged, and forged, and the support which it is necessary to preserve at the forward side of and below the forming type for the purpose of preventing imperfect location of such type will not be impaired when the space-forming means operates in this manner.

Either the typebar-blank or the space-forming tool may be operated in contact with the other to form a space in advance of the type, but I prefer to actuate the cutter itself, and in the construction shown the cutter, which may be a planing tool, such as $c$, is carried by a cutter-bar or cutter-carrier 20, pivoted at one of its ends to one arm 21' of an angle-lever 21, supported at some suitable point, such as 22, on the frame-work, the other arm of the angle-lever being pivoted to a connecting-rod 23, which in turn is pivoted on, and operated by, the lever T, so as to impart to the cutter-bar 20 a reciprocatory movement whenever the lever T is operated.

The cutter $c$ is preferably so constructed as to cut in both directions as it is reciprocated back and forth in contact with the edge of the bar, and in order to accomplish this it should have two cutting edges $c'$ and $c''$, the former of which takes a chip from the stock as the die-carrier moves toward the right, as seen in Fig. 1, while the latter removes its chip when the die-carrier is moved to the left, as seen in said figure.

In order that the cutter may operate progressively at different depths in the typebar-blank it is, of course, necessary to impart to one of the coöperating parts a feed movement, and in this case both of said parts are so operated, the cutter being fed down toward the blank at the same time that the blank is fed up toward the die. I prefer to derive this feed movement from the same source as that from which the regular upward feed of the blank is obtained, and hence I have shown herein on the short shaft or spindle 45 a second cam, designated herein by 50, and similar in its contour and operation to the cam 47, except that it is differently placed. For the purpose of taking off this feed movement I have shown herein at 51 a forked connecting-rod pivoted at its lower end near the free end of the cutter-bar 20 and carrying an antifriction-roll 52, which works in contact with the face of the cam 50, the forked portion 51' of said rod straddling the forward end of the short shaft 45 and being guided and held in place by suitable collars 55 and 56. The antifriction-roll 52 may be held up against the face of its cam 50 in any suitable manner—as, for example, by means of a spring-pressed bolt 57, mounted in a bored opening in a post 2' rising from the base 2, said bolt being preferably squared at its upper end and connected directly to the free end of the cutter-bar 20. (See Fig. 5.)

In Figs. 13 to 19, inclusive, I have illustrated those steps in the operation of the space-forming tool or cutter which correspond to the steps of the type-forming operation illustrated in Figs. 6 to 12, inclusive. It will be seen from these that at substantially the same time that the die comes down upon the blank the cutting edge $c'$ of the cutter begins to take a chip from the space-field in advance of the type-field being operated upon by the die, and when the die in its cycloidal movement reaches the cusp of intersection of the two cycloidal branches along which it moves the cutting edge $c'$ should be half way across the blank, as shown in Fig. 13. On the return movement thereof as the die is rolled from the right to the left, as seen in Fig. 1 and in Figs. 6 to 12, the operation should be substantially the same, except that it will be in the opposite direction; that is to say, the cutting edge $c''$ will begin to take its chip at substantially the same time that the die rolls on to the blank, and when such die reaches the cusp in its cycloidal movement said cutting edge $c''$ should also be at the center of the bar, as illustrated in Fig. 14. Not only should the operation of the cutter crosswise of the bar correspond in time to the type-forming action, but the space-forming action should be carried down into the bar at substantially the same rate that the type-forming operation proceeds. In other words, the stock contained in the space-field immediately in advance of, and supplementary to, the type-field should be removed no faster than the type-forming operation carries down the stock contained in the type-field and with it the base of the forming type. Thus the type-forming and space-forming operations proceed gradually and at substantially the same rate of speed and there is always a sufficient body of stock preserved in the space-field in advance of such type-field to prevent dislocation and malformation of the type, as would be the case if the stock in the space-field were removed too rapidly.

The cams 47 and 50 not only correspond in contour, but the timing of the parts controlled thereby—viz., the blank and the cutter—is intended to be the same. Hence when the type is finished and the blank-carrier and its blank are released and permitted to drop, by the riding of the antifriction-roll 15''' down the let-off face 47'', the cutter $c$ should also be withdrawn from the bar at substantially the same time by the riding of the antifriction-roll 52 down the let-off face of the cam 50. It should be understood, of course, that the cutting edge $c''$ should complete the taking of its chip (see Fig. 19) before the release of the blank and the cutter by said cams, this releasing action taking place on the twenty-third stroke of the lever T—that is, on the last stroke to the left. In order that this space may be formed immediately in advance of a simultaneously formed type it is, of course, necessary that the rear face of the cutter $c$ be substantially coincident with the extreme, forward, outer wall of the die, and hence the die and the cutter while operating upon the blank to form respectively a type and a space should work in contact with each other, the cutter serving to remove all that portion of the stock which lies within the space-field, while the die serves to form a type, and roll away surplus material, from that portion of the stock lying within the type-field without encroaching upon the stock of the space-field in advance thereof; and when these parts operate in this manner no part of a space in advance of a type is formed by the die which makes such type.

After the completion of any type and the space in advance thereof a new type, and also a corresponding space, may be formed by the same die and the cutter or by bringing another die into position to coöperate with such cutter. In order to present a new portion of the blank to the action of such die and the cutter suitable feed mechanism may be used, and in the construction shown the carriage B has depending therefrom a lug 60, which is bored to form a nut through which may be passed a feed-screw, such as 61, having a round shank 61', journaled in a bearing 62, at one end of the base 2, and preferably having secured thereto a handle 61'', for turning said screw. Each turn of this screw may represent a unit distance corresponding to a unit of width of a type to be formed, and by turning the handle 61'' the proper number of times the blank may be fed forward any given number of units corresponding to the width of the type to be formed by any particular die which may be brought into action.

The fins $f$ and $f'$, which are rolled off by the die during the formation of each individual type, may be removed in any suitable manner, usually by means of planing cutters (not shown) to bring the sides of the bar into parallelism with each other.

Having described my invention, I claim—

1. In a typebar machine, the combination with a blank holder for a typebar blank, of a type die, means for imparting a relative working movement to the typebar blank and the die to form a type on the edge of such blank while the forming type is supported at its forward side by adjoining stock, and separate means for forming a space in advance of said type.

2. In a typebar machine, the combination with a blank holder for a typebar blank, of a type die, means for imparting a relative working movement to the typebar blank and the die to form a type on the edge of such blank, and separate means for forming a space in advance of said type not earlier than the beginning of the type-making operation.

3. In a typebar machine, the combination with a blank holder for a typebar blank, of a type die, means for imparting a relative curvilinear working movement to the typebar blank and the die to form a type on the edge of such blank while the forming type is supported at its forward side by adjoining stock, and separate means for forming a space in advance of said type.

4. In a typebar machine, the combination with a blank holder for a typebar blank, of a type die, means for imparting a relative reciprocatory working movement in a curvilinear path to the typebar blank and the die to form a type on the edge of such blank while the forming type is supported at its forward side by adjoining stock, and separate means for forming a space in advance of said type.

5. In a typebar machine, the combination with a blank holder for a typebar blank, of a type die, means for rolling the typebar blank in contact with said die to form a type on the edge of such blank while the forming type is supported at its forward side by adjoining stock, and separate means for forming a space in advance of said type.

6. In a typebar machine, the combination with a blank holder for a typebar blank, of a type die, means for rolling the typebar blank in contact with said die and in a direction transverse to the blank to form a type on the edge of such blank while the forming type is supported at its forward side by adjoining stock, and separate means for forming a space in advance of said type.

7. In a typebar machine, the combination with a blank holder for a typebar blank, of a type die, means for rolling the typebar blank a plurality of times in contact with said die to form a type on the edge of the blank while the forming type is supported at its forward side by adjoining stock, and separate means for forming a space in advance of said type.

8. In a typebar machine, the combination with a blank holder for a typebar blank, of a type die, means for imparting a relative reciprocatory rolling movement to the typebar blank and the die to form a type on the edge of such blank while the forming type is supported at its forward side by adjoining stock, and separate means for forming a space in advance of said type.

9. In a typebar machine, the combination with a blank holder for a typebar blank, of a type die; means for imparting a relative working movement to the typebar blank and the die to form a type on the edge of such blank while the forming type is supported at its forward side by adjoining stock; separate means for forming a space in advance of said type; and means for feeding said type-making elements together during the type-making operation.

10. In a typebar machine, the combination with a blank holder for a typebar blank, of a type die; actuating mechanism for imparting a relative working movement to the typebar blank and the die while the two are in contact to form a type on the edge of such blank while the forming type is supported at its forward side by adjoining stock; separate means for forming a space in advance of said type; and means controlled by said actuating mechanism for feeding said type-making elements together during the type-making operation.

11. In a typebar machine, the combination with a blank holder for a typebar blank, of a type die, means for imparting a relative working movement to the typebar blank and the die to form a type in the type-blank portion of such typebar blank while the forming type is supported at its forward side by adjoining stock, and separate means for forming a space in a space-blank portion contiguous to and in advance of such type-blank portion.

12. In a typebar machine, the combination with a blank holder for a typebar blank, of a type die, means for imparting a relative working movement to the typebar blank and the die to form a type in the type-blank portion of such typebar blank while the forming type is supported at its forward side by adjoining stock, and separate means for forming in a space-blank portion contiguous to and in advance of said type a space having its rear wall defined by the forward wall of said type.

13. In a typebar machine, the combination with a blank holder for a typebar blank, of a type die, a separate space-forming tool operative in a path which is the supplement of the path of operation of said die, and means for rolling a type-blank portion of such typebar blank in contact with the die while the forming type is supported at its forward side by adjoining stock, and for also operating the typebar blank and the space-forming tool in contact with each other to form a space in advance of said type.

14. In a typebar machine, the combination with a blank holder for a typebar blank, of a type die the extreme outer forward wall of which is substantially in the plane of the extreme forward point of the inner wall of the die space; a space-forming tool operative in a path the rear edge of which is defined by said extreme outer forward wall of the die; and means for rolling a type-blank portion of such typebar blank in contact with the die while the forming type is supported at its forward side by adjoining stock and for also operating the typebar blank and the space-forming tool in contact with each other to form a space in advance of said type.

15. The combination with die-operating and blank-rolling mechanism, of independent space-forming mechanism.

16. In a typebar-machine, the combination, with a blank-holder for a typebar-blank, of a die, means for imparting a reciprocatory rolling movement to said die while in contact with said blank and a separate space-forming tool.

17. The combination with die-forming and blank rolling mechanism, of independent space-forming mechanism operative in unison with the die-operating and blank rolling mechanism.

18. In a typebar-machine, the combination, with a blank-holder for a typebar-blank, of a die; die-reciprocating means for reciprocating said die in a curvilinear path while in contact with said blank; blank-feeding means and a separate space-forming tool.

19. In a typebar-machine, the combination, with a blank-holder for a typebar-blank, of a die; die-reciprocating means for reciprocating said die in a curvilinear path while in contact with said blank; and blank-feeding means controlled by said die-reciprocating means.

20. In a typebar-machine, the combination, with a blank-holder for a typebar-blank, of a die; die-reciprocating means for reciprocating said die in a curvilinear path while in contact with said blank; and step-by-step blank-feeding means controlled by said die-reciprocating means.

21. In a typebar-machine, the combination, with a blank-holder for a typebar-blank, of a die; die-reciprocating means for reciprocating said die in a curvilinear path while in contact with said blank; and pawl-and-ratchet-wheel blank-feeding mechanism controlled by said die-reciprocating means.

22. In a typebar-machine, the combination, with a blank-holder for a typebar-blank, of a die; die-reciprocating means for reciprocating said die in a curvilinear path while in contact with said blank; and step-by-step blank-feeding means controlled by said die-reciprocating means and embodying a feed-cam.

23. In a typebar-machine, the combination, with a blank-holder for a typebar-blank, of a die; die-reciprocating means for reciprocating said die in a curvilinear path while in contact with said blank; and step-by-step blank-feeding means controlled by said die-reciprocating means and embodying a gradually-rising rotary feed-cam.

24. In a typebar-machine, the combination, with a blank-holder for a typebar-blank, of an orbitally-movable driven gear and a resistant driving-gear one of which is shiftable in the plane of such orbital movement into and out of mesh with the other, and a blank-rolling die movable in unison with said driven gear.

25. In a typebar-machine, the combination, with a blank-holder for a typebar-blank, of an orbitally-movable driven gear; a pivoted rack in mesh with said driven gear and oscillatory about its pivot in the plane of such orbital movement into and out of mesh with said driven gear; and a blank-rolling die movable in unison with said driven gear.

26. The combination with selective dies, and mechanism for bringing each selective die in turn to the working point, of a space-forming instrumentality independent from the dies, and mechanism for operating such instrumentality and the dies in unison to roll the blank on which the types are formed.

27. The combination with selective dies and mechanism for operating each selected die in turn to thereby form a line of type, of a space-forming instrumentality independent from the dies, mechanism for operating such instrumentality in unison with each operating die, feed mechanism for feeding each operating die and the space-forming instrumentality into the blank, and means to roll said blank with each selected die.

28. The combination with selective dies, and mechanism for operating each selected die in turn to thereby form a line of type, of a space-forming instrumentality independent from the dies, mechanism for operating such instrumentality in unison with each operating die, feed mechanism for feeding each operating die and the space-forming instrumentality into the blank, means for shifting the blank longitudinally to bring each selective die in turn into coöperative relation with its corresponding type-blank portion of the typebar blank, and means to roll said blank with each selected die.

29. The combination with an adjustable die carrier, selective dies mounted thereon, and mechanism for operating the carrier after each adjustment to thereby form a line of type on a blank, of a space-forming instrumentality independent from the dies, mechanism for operating such instrumentality in unison with the operating die carrier and means to roll said blank with each selective die.

30. The combination with an adjustable die carrier, selective dies mounted thereon, and mechanism for operating the carrier after each adjustment to thereby form a line of type on a blank, of a space-forming instrumentality separate from the dies, mechanism for operating such instrumentality in unison with the operating die carrier, feed mechanism for feeding each operating die and the space-forming instrumentality into the blank, and means for shifting the blank longitudinally and means to roll said blank with each selective die.

31. The combination with blank rolling die mechanism of independent space-forming mechanism operating concurrently therewith.

32. The combination with selective dies, and mechanism for rolling the blank with each selected die in turn to thereby form a line of type, of a space-forming instrumentality separate from the dies, and mechanism for operating such instrumentality in unison with each operating die.

33. The combination with selective dies, and mechanism for rolling the blank with each selected die in turn to thereby form a line of type, of a space forming instrumentality separate from the dies, mechanism for operating such instrumentality in unison with each operating die, and feed mechanism for feeding each operating die and the space-forming instrumentality into the blank.

34. The combination with an adjustable die carrier, selective dies mounted thereon, and mechanism for die-rolling the blank in a direction transverse to the line of length thereof, of a reciprocative space-forming instrumentality separate from the dies, and mechanism for reciprocating the space-forming instrumentality transversely to the line of length of the blank and in unison with each operating die.

35. The combination with an adjustable die carrier, selective dies mounted thereon, and mechanism for die-rolling the blank in a direction transverse to the line of length thereof, of a reciprocative space-forming instrumentality separate from the dies, mechanism for reciprocating the space-forming instrumentality transversely to the line of length of the blank and in unison with each operating die, feed mechanism for feeding each selected die and the space-forming instrumentality into the blank, and means for shifting the blank longitudinally.

36. The combination with mechanism for die-rolling a blank crosswise by repeated movements to form a type gradually and by separate operations, of a separate space-forming mechanism.

37. The combination with mechanism for die-rolling a blank crosswise by repeated movements to form a type gradually and by successive operations, of a separate space-forming mechanism operative in unison with the die-operating mechanism.

38. The combination with selective dies adapted to form a succession of types each by a succession of gradual reductions, and mechanism for rolling the blank with each selected die in turn to thereby form a line of type, of a space-forming instrumentality separate from the dies and mechanism for operating such instrumentality in unison with each operating die.

39. The combination with selective dies adapted to form a succession of types each by a succession of gradual reductions, and mechanism for rolling the blank with each die in turn to thereby form a line of type, of a space-forming instrumentality separate from the dies, mechanism for operating such instrumentality in unison with each operating die, and feed mechanism for feeding each operating die and the space-forming instrumentality into the blank.

40. The combination with an adjustable die carrier, selective dies mounted thereon and adapted to form a succession of types each by a succession of gradual reductions, and mechanism for die-rolling the blank in a direction transverse to the line of length thereof, of a reciprocative space-forming instrumentality separate from the dies, and mechanism for reciprocating the space-forming instrumentality transversely to the line of length of the blank and in unison with each operating die.

41. The combination with an adjustable die carrier, selective dies mounted thereon and adapted to form a succession of types each by a succession of gradual reductions, and mechanism for die-rolling the blank in a direction transverse to the line of length thereof, of a reciprocative space-forming instrumentality separate from the dies, mechanism for reciprocating the space-forming instrumentality transversely to the line of length of the blank and in unison with each operating die, feed mechanism for feeding each operating die and the space-forming instrumentality into the blank, and means for shifting the blank longitudinally.

42. The combination with blank operating mechanism, of mechanism for forming characters on said blank, and means independent of said forming mechanism, but operable in unison therewith, for operating on the blank between the types.

43. The combination with blank operating mechanism, of mechanism for breaking down a portion of the edge of the blank and forming a type thereon, and means operating in unison therewith but independent thereof for forming a space between such broken down portion and the blank.

44. The combination with blank operating mechanism, of mechanism for breaking down a portion of the edge of the blank and forming a type thereon, and means operating in unison therewith but independent thereof for cutting out a space between such broken down portion and the blank.

45. The combination with blank operating mechanism of mechanism for breaking down a portion of the edge of the blank and forming a type thereon, and means operating in unison and in concurrence therewith but independent thereof for cutting out a space between such broken down portion and the blank.

46. The combination with die-operating mechanism, of independent space forming mechanism, and means for concurrently actuating the same.

47. The combination with blank working mechanism, of independent blank cutting mechanism, and means for concurrently actuating the same in unison.

48. The combination with means for working the edge of a typebar blank, of means for space-cutting the same adjacent to the worked portion, and means for transversely rolling one of these and reciprocating the other concurrently.

49. The combination with means for rolling types on the edge of a blank, of means for concurrently cutting a space.

50. The combination with means for transversely rolling a blank edge, of means for concurrently transversely space-cutting the same.

51. The combination with type-dies, of means for rolling these transversely of a blank for forming types, space forming mechanism, and means for concurrently actuating said mechanisms.

52. The combination with a type bar blank holder, of an orbitally movable die, a reciprocatory space cutting mechanism, and means for concurrently actuating said mechanisms.

53. The combination of means for forming a line of type on a blank, means for forming a space between such type and effective during both its to and fro movements transversely of the blank to form a space and means for giving said space forming means movements to and fro transversely of the blank.

54. The combination of means for forming a type on a blank, means for forming a space in advance of such type and effective during both its to and fro movements transversely of the blank to form a part of such space and means for giving said space forming means movement to and fro transversely of the blank.

55. The combination of means for forming a type on a blank, means for forming a space in advance of such type and comprising a planing instrumentality operative to plane in both directions transversely of the blank and means for giving said space forming means movement to and fro transversely of the blank.

56. The combination of means for rolling and compressing a blank to form type thereon, and means for concurrently but independently forming a space in advance of each type, both said type and space being formed step by step, the formation of one continuing throughout the formation of the other.

57. The combination of means for gradually compressing each type of a succession of type on a blank, means for planing a space in advance of each type and effective to plane in both directions transversely of said blank, means for moving the planing means transversely of the blank, and means connecting the die compressing means and said moving means for effecting concurrent action thereof.

58. The combination of means for gradually compressing a type on a blank, independent means for planing a space in advance of said type and effective to plane in both directions transversely of said blank, means for moving the planing means transversely of the blank, and means connecting the die compression means and said moving means for effecting concurrent action thereof.

FRANCIS H. RICHARDS.

Witnesses:
FRED. J. DOLE,
C. E. VOSS.